Oct. 22, 1935. W. W. HACKETT Re. 19,731

TUBULAR METALLIC SHAFT

Original Filed June 26, 1930

Inventor,
Walter William Hackett,
By [illegible]
Atty.

Reissued Oct. 22, 1935

Re. 19,731

UNITED STATES PATENT OFFICE 19,731

TUBULAR METALLIC SHAFT

Walter William Hackett, Oldbury, near Birmingham, England, assignor to The American Fork & Hoe Company, Geneva, Ohio, a corporation of Ohio Original No. 1,974,271, dated September 18, 1934, Serial No. 463,981, June 26, 1930. Application for reissue December 28, 1934, Serial No. 759,554. In Great Britain October 26, 1929

18 Claims. (Cl. 273—80)

This invention has relation to tubular metallic shafts adapted for golf clubs, and their manufacture.

Previously it has been proposed to construct such tubular metallic shafts having a handle part of substantially uniform diameter and a major part of uniform conical taper, but the flexibility is a constant one, and the varying requirements of players with regard to flexibility can only be attained by the manufacture of shafts having different diameters, the point of maximum flexibility being a constant for any particular size.

The present invention has for its object to produce tubular metallic shafts adapted for golf clubs having greater adaptability in the flexing of the shaft according to the requirements of individual players.

With this end in view, I provide a tubular metallic shaft having its major or centre part of elongated conoidal formation, that is to say, having a decreasing or arcuate taper as differentiated from a uniform or straight one. This major or centre part at its minor dimension preferably merges into a part of substantially uniform diameter having a dimension equal to the aforesaid minor dimension, and at its major dimension merges into the handle part also of substantially uniform diameter.

In order that this invention may be fully understood and readily carried into practice, reference is had to the annexed explanatory sheet of drawing, upon which:—

Figure 1:
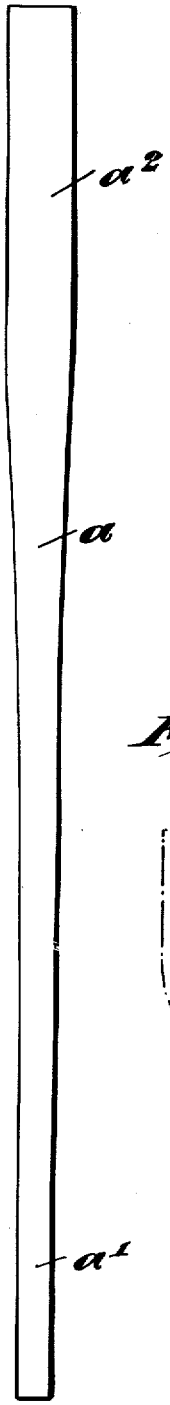
Figure 2:
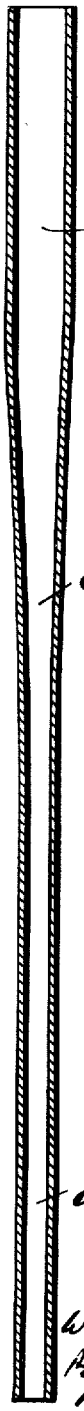
Figure 3:
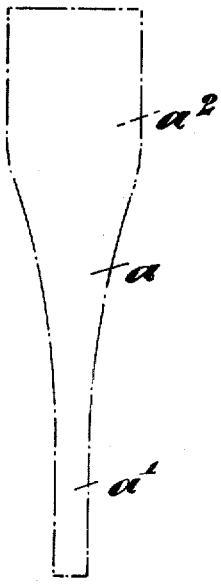

Fig. 1 is an elevational view of a tubular metallic shaft suitable for a golf club, constructed according to the present invention; Fig. 2 illustrates the shaft in a vertical sectional elevation, while Fig. 3 is a diagrammatic view of exaggerated form for clearly defining the conoidal portion.

In the embodiment of the present invention shown, the tubular metallic shaft comprises a major or center part $a$ of elongated conoidal formation, as differentiated from the previously proposed uniform conical taper. This conoidal formation at its minor dimension merges into a terminal part $a^1$ of substantially uniform diameter, the mergence being preferably such that no part of the shaft adapted for disposition between the hand grip supporting portion $a^2$ and the club head supporting end of the portion $a^1$ is of a lesser diameter than the part $a^1$. At its upper extremity the conoidal portion $a$ merges into the handle part $a^2$ also of substantially uniform diameter. The respective lengths of the parts $a^1$ and $a^2$ may be varied, as may be desirable, although as illustrated in the drawing it is preferable that the part $a$ should be disposed relatively distant from the club head supporting end of the part $a^1$, to ensure that portions of the shaft relatively remote from the club head will be substantially flexed during use of the club in which the shaft is incorporated. In fact, the part $a^1$ may be dispensed with. Also, the portion $a^1$ may itself have a tapered extremity for engaging the tapered socket in the club head.

In a golf club of this invention the individual requirements of players can be readily accommodated by the relative proportioning of the parts $a$ $a^2$ and the part $a^1$ if present.

The tubing may be formed by a rolling operation, or may be formed in any other suitable way as by the use of compression dies. As for instance, tubing of a diameter equal to the handle part $a^2$ may be rolled or pressed down to constitute the parts $a$ and $a^1$.

I claim:—

1. A golf club shaft in the form of a metallic tube the medial portion of which, throughout a major portion of the length of the shaft, is of concave conoidal form.

2. A golf club shaft in the form of a metallic tube the major portion of the length of which is of concave conoidal form, said shaft having a club end portion of cylindrical form constituting a continuation of the smaller end of the concave conoidal portion thereof and of the same diameter as the smaller end of said conoidal portion.

3. A golf club shaft in the form of a metallic tube the major portion of the length of which is of concave conoidal form, said shaft having a handle end portion of cylindrical form constituting a continuation of the larger end of the concave conoidal portion thereof and of the same diameter as the larger end of said conoidal portion.

4. A golf club shaft in the form of a metallic tube having a cylindrical handle portion of relatively large diameter and a cylindrical end portion of relatively smaller diameter, the said shaft, throughout the medial portion of its length between the handle and club end portions thereof being of concave conoidal form and of the same diameter at its ends as the handle and club end portions, respectively.

5. A golf club shaft in the form of a metallic tube the medial portion of which, throughout a substantial portion of the length of the shaft, is of a generally concave conoidal form.

6. A golf club shaft in the form of a metallic tube, the intermediate portion of which proceeding from the handle end thereof to the club head supporting end is of progressively reduced diameter, the reduction throughout different parts of the said intermediate portion being at progressively reduced rates as the club head end is approached, whereby the medial portions of said intermediate portion will be spaced inwardly from a truly conical projection extending between the said handle end and the said club head end of the shaft.

7. A shaft for golf clubs in the form of a metallic tube having a medial portion extending throughout a substantial portion of the length of the shaft, which is of progressively reduced outside diameters proceeding toward the club head end of the shaft and the rate of such diametrical reduction being progressively decreased so that intermediate portions of the outer surface of said medial portion will be disposed radially inwardly of a true frusto-conical surface extending between two other portions of such surface which are spaced substantially apart and which longitudinally bound any said radially inwardly disposed surface portion.

8. A shaft for golf clubs in the form of a metallic tube having a medial portion extending throughout a substantial portion of the length of the shaft, which is of progressively reduced outside diameters proceeding toward the club head end of the shaft and the rate of such diametrical reduction being progressively decreased so that intermediate portions of the outer surface of said medial portion will be disposed radially inwardly of a true frusto-conical surface extending between two other portions of such surface which are spaced substantially apart the portion of greatest distance inwardly from the frusto-conical surface being disposed closest to the terminal portion of the frusto-conical surface engaging the handle end of the shaft.

9. A golf club shaft comprising a metallic tube having a hand grip supporting portion and a club head supporting end, and an intermediate portion disposed between the hand grip supporting portion and the club head supporting end, the upper half of the said intermediate portion which is disposed adjacent the hand grip supporting portion being of generally conoidal form, the lower half of the said intermediate portion and which is disposed adjacent the club head supporting end of the shaft being of substantially cylindrical form.

10. A golf club shaft comprising a metallic tube having a hand grip supporting portion and a club head supporting end, and an intermediate portion disposed between the hand grip supporting portion and the club head supporting end, the upper half of the said intermediate portion which is disposed adjacent the hand grip supporting portion being of generally concave conoidal form, the lower half of the said intermediate portion and which is disposed adjacent the club head supporting end of the shaft being of substantially cylindrical form.

11. A golf club shaft comprising a metallic tube having a hand grip supporting portion and a club head supporting end, and an intermediate portion disposed between the hand grip supporting portion and the club head supporting end, the upper half of the said intermediate portion which is disposed adjacent the hand grip supporting portion being of generally conoidal form, the lower half of the said intermediate portion and which is disposed adjacent the club head supporting end of the shaft having a different relationship of succeeding outside diameters proceeding in the direction towards the club head end from that of the upper said half of the said intermediate shaft portion.

12. A golf club shaft comprising a metallic tube having a hand grip supporting portion and a club head supporting end, and an intermediate portion disposed between the hand grip supporting portion and the club head supporting end, the upper half of the said intermediate portion which is disposed adjacent the hand grip supporting portion being of generally concave conoidal form, the lower half of the said intermediate portion and which is disposed adjacent the club head supporting end of the shaft having a different relationship of succeeding outside diameters proceeding in the direction towards the club head end from that of the upper said half of the said intermediate shaft portion.

13. A golf club shaft comprising a metallic tube having a hand grip supporting portion and a club head supporting end, and an intermediate portion disposed between the hand grip supporting portion and the club head supporting end, substantially the upper half only of the said intermediate portion which is disposed adjacent the hand grip supporting portion being of generally conoidal form.

14. A golf club shaft comprising a metallic tube having a hand grip supporting portion and a club head supporting end, and an intermediate portion disposed between the hand grip supporting portion and the club head supporting end, substantially the upper half only of the said intermediate portion which is disposed adjacent the hand grip supporting portion being of generally concave conoidal form.

15. A shaft or rod forming a handle for a sporting implement in the form of a metallic tube the medial portion of which, throughout a substantial portion of the length of the shaft, is of a generally concave conoidal form.

16. A shaft or rod forming a handle for a sporting implement in the form of a metallic tube, the intermediate portion of which proceeding from the hand grip end to the opposite end thereof is of progressively reduced diameter, the reduction throughout different parts of the said intermediate portion being at progressively reduced rates as the said opposite end is approached, whereby the medial portions of said intermediate portion will be spaced inwardly from a truly conical projection extending between the said handle end and the said opposite end of the shaft.

17. A shaft or rod for a sporting implement in the form of a metallic tube having a hand grip supporting end, and at its other end being of relatively smaller diameter, and the medial portion of the tube throughout a substantial portion of the tube length being of generally concave conoidal form.

18. A shaft or rod for a sporting implement in the form of a metallic tube, having a hand grip supporting end, the intermediate portion of the tube proceeding from the hand grip supporting end to the opposite end thereof being of progressively reduced diameter, the reduction throughout different parts of the said intermediate portion being at progressively reduced rates as the said opposite end is approached, whereby the medial portions of said intermediate portion will be spaced inwardly from a truly conical projection extending between the said hand grip supporting end and the said opposite end of the shaft.

WALTER WILLIAM HACKETT.